(12) United States Patent
Krossner

(10) Patent No.: US 11,705,115 B2
(45) Date of Patent: Jul. 18, 2023

(54) PHONETIC KEYBOARD AND SYSTEM TO FACILITATE COMMUNICATION IN ENGLISH

(71) Applicant: William Krossner, Clive, IA (US)

(72) Inventor: William Krossner, Clive, IA (US)

(*) Notice: Subject to any disclaimer, the term of this patent is extended or adjusted under 35 U.S.C. 154(b) by 18 days.

(21) Appl. No.: 17/362,428

(22) Filed: Jun. 29, 2021

(65) Prior Publication Data

US 2021/0407501 A1 Dec. 30, 2021

Related U.S. Application Data

(60) Provisional application No. 63/045,481, filed on Jun. 29, 2020.

(51) Int. Cl.
*G10L 15/187* (2013.01)
*G06F 3/02* (2006.01)
*G06F 40/58* (2020.01)

(52) U.S. Cl.
CPC .......... *G10L 15/187* (2013.01); *G06F 3/0219* (2013.01); *G06F 3/0221* (2013.01); *G06F 40/58* (2020.01)

(58) Field of Classification Search
CPC ......... G10L 15/187; G06F 40/58; G06F 3/02; G06F 3/0219; G06F 3/04886
See application file for complete search history.

(56) References Cited

U.S. PATENT DOCUMENTS

| 2005/0128108 A1* | 6/2005 | Fong | G06F 3/0219 341/22 |
| 2005/0182616 A1* | 8/2005 | Kotipalli | G06F 40/126 704/2 |
| 2013/0132848 A1* | 5/2013 | Bhatt | G06F 9/542 715/733 |
| 2015/0185868 A1* | 7/2015 | Bevoor | G06F 3/0234 345/171 |
| 2017/0177569 A1* | 6/2017 | Raemy | G06F 40/55 |
| 2019/0235638 A1* | 8/2019 | Lee | G06F 3/0235 |

* cited by examiner

*Primary Examiner* — Priyank J Shah
(74) *Attorney, Agent, or Firm* — Mark David Torche; Patwrite Law

(57) ABSTRACT

A system to facilitate communication in English uses a keyboard having at least one phoneme key that displays a phonetic pronunciation symbol that represent sounds of spoken English. The system also includes a computer board disposed within the keyboard and a processor and associated memory in electrical communication with an input from the phoneme key. The processor executes a set of computer instructions that bi-directionally translates the input as a standard English letter to a phonetic pronunciation or from a phonetic input to a standard English letter. An output device in electrical communication with the keyboard wherein the standard English letter is displayed is also provided. In one embodiment, a computing device configured to execute a set of computer instructions is provided that display a digitally produced keyboard for display that uses a downloadable APP to translate between a phonetic input and a standard English letter and displays a result.

8 Claims, 9 Drawing Sheets

PHONETIC KEYBOARD AND SYSTEM TO FACILITATE COMMUNICATION IN ENGLISH

CROSS REFERENCE TO RELATED APPLICATIONS

This application claims priority and herein incorporates by reference U.S. provisional patent application 63/045,481, filed Jun. 29, 2020.

The English language has a robust linguistic background and has borrowed words from a variety of other languages. In the beginning, English was mostly a spoken language which led to even more inconsistencies in spelling. Because of the non-orthographic nature of English, it can be especially difficult to learn to write.

Some examples of the difficulties in writing in English include some of the following:
- the use of silent letters such as the very common silent "e" in words like "use", "please", and "cease" just to name a few;
- two sounds for the same letter such as the "c" in success where the first appearing "c" is a "k" sound with the second being pronounced as an "s";
- many spellings for the same sound such as "true', "you", "stew" and "through";
- different pronunciations for the same spelling of a word such as wound, minute, refuse, and project.

There is a need for keyboard and system that helps those learning English, both schoolchildren as well as adult non-native speakers, to be able to write English using a phonetic approach without the need to mentally translate.

SUMMARY OF THE INVENTION

A system to facilitate communication in English uses a keyboard having at least one phoneme key that displays a phonetic pronunciation symbol that represent sounds of spoken English. The system also includes a computer board disposed within the keyboard and a processor and associated memory in electrical communication with an input from the phoneme key. The processor executes a set of computer instructions that bi-directionally translates the input as a standard English letter to a phonetic pronunciation or from a phonetic input to a standard English letter. An output device in electrical communication with the keyboard wherein the standard English letter is displayed is also provided. In one embodiment, a computing device configured to execute a set of computer instructions is provided that display a digitally produced keyboard for display that uses a downloadable APP to translate between a phonetic input and a standard English letter and displays a result.

Other features and advantages of the instant invention will become apparent from the following description of the invention which refers to the accompanying drawings.

DETAILED DESCRIPTION OF THE INVENTION

Figure 1:
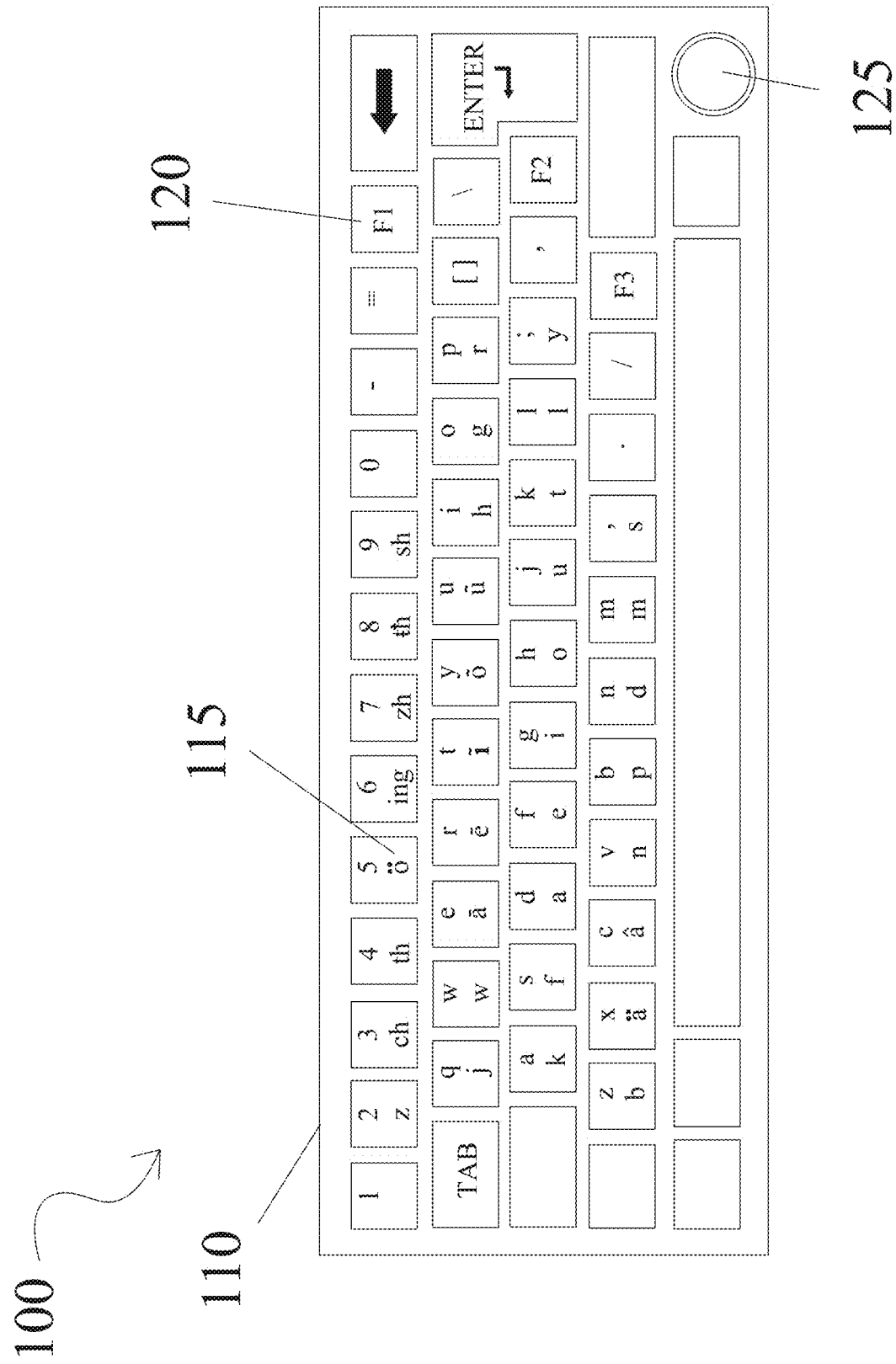
FIG. 1 is a drawing of a keyboard showing phonetic characters displayed on keys according to an embodiment of the invention.

In the following detailed description of the invention, reference is made to the drawings in which reference numerals refer to like elements, and which are intended to show by way of illustration specific embodiments in which the invention may be practiced. It is understood that other embodiments may be utilized and that structural changes may be made without departing from the scope and spirit of the invention.

Referring to FIGS. 1-4, a phonetic keyboard and system to facilitate communication in English 100 is shown having a keyboard 110 with phonetic keys 115. Phoneme keys 115 are used to represent sounds rather than reflecting the actual letters used to spell a word. Phoneme keys 115 are phonemes that represent the sounds of spoken English. Phonemes are often represented by complicated and unusual symbols in conventional dictionaries or other language reference texts while the instant invention utilizes symbols which are all derived from standard letters. There are many different phonetic alphabets and schemes and any acceptable phonetic scheme could be used including, but not limited to the International Phonetic Alphabet (IPA), American Phonetic Alphabet, Speech Assessment Methods Phonetic Alphabet (SAMPA) or Shavian Alphabet as is known in the art.

Phoneme keys 115 are similar to standard English letter and are suggestive of the phoneme's actual pronunciation. A keyboard switch key 125 is provided to provide various functionality such as, but not limited to, turning on and off backlighted keys, power on and off electronics, switch between conventional key locations and phonetic function, etc.

Figure 2:
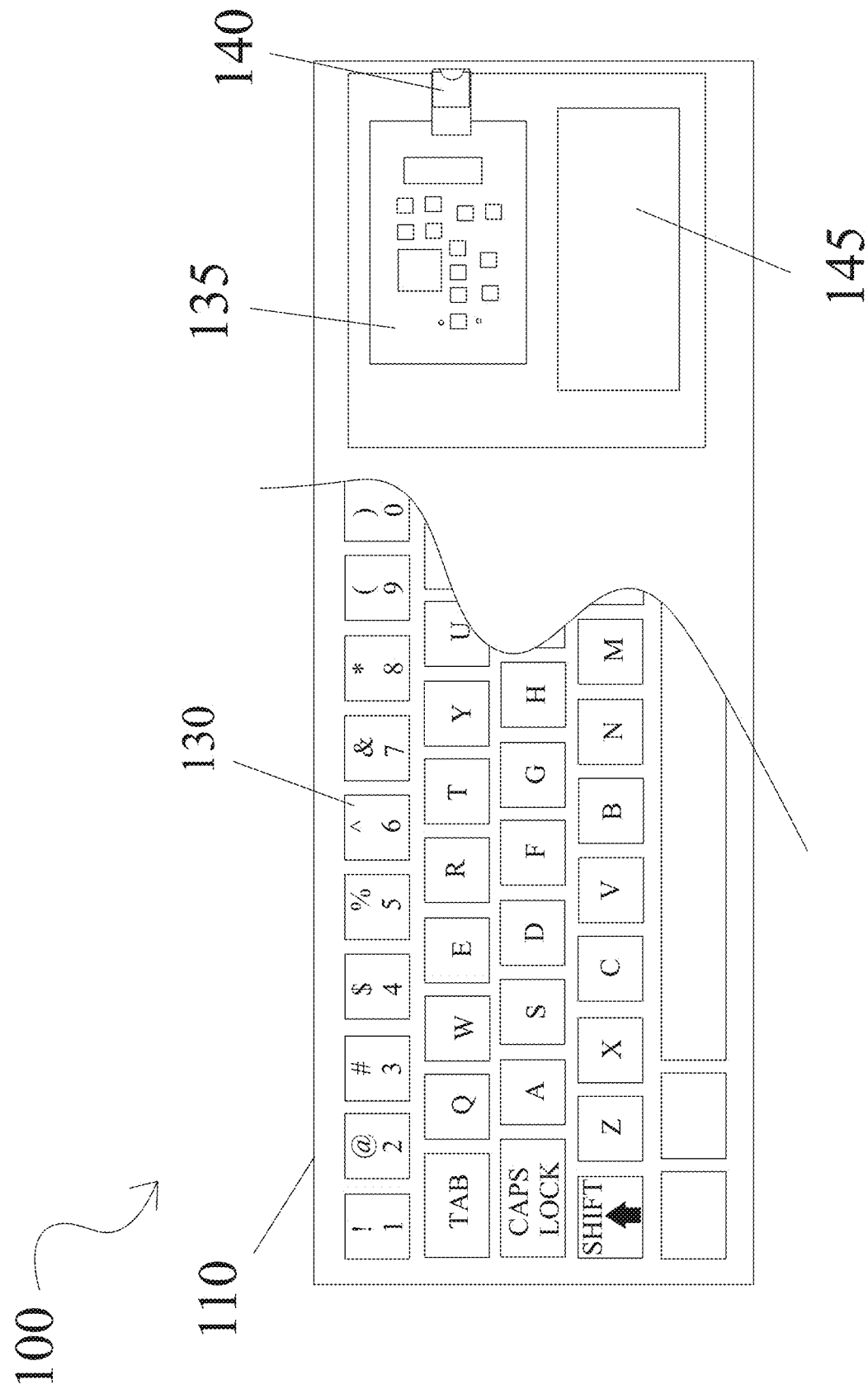
FIG. 2 is a cut-away view of the keyboard shown in FIG. 2.
Figure 3:
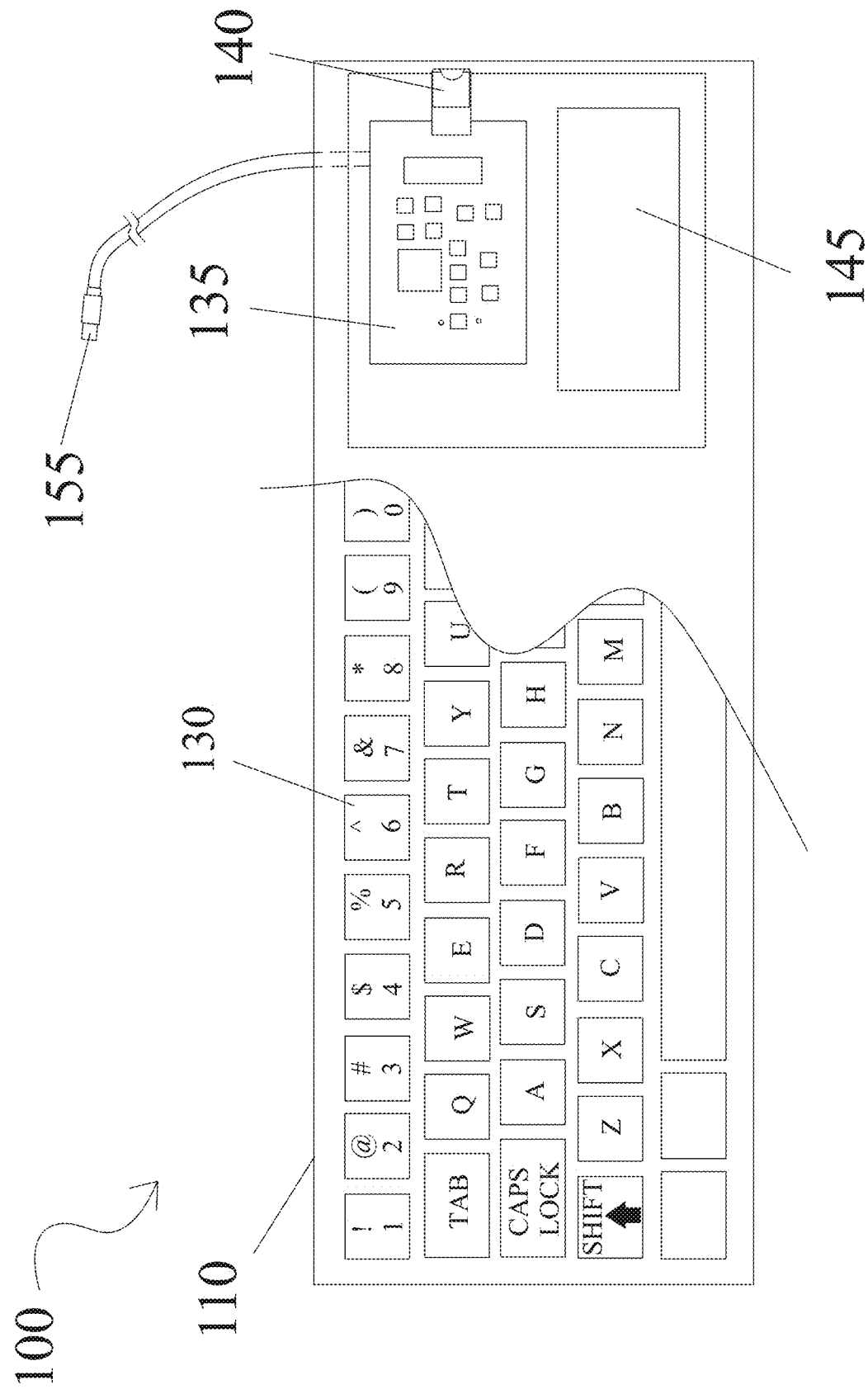
FIG. 3 is a wired embodiment of the keyboard shown in FIG. 3.

Referring now to FIGS. 2 and 3, keyboard 110 is shown with a cut-away showing a computer board 135 that is built into keyboard 110 to perform the translation function described herein. Computer board 135 is understood to contain the functionality such as storage, RAM, ROM, central processor and hardware and software code as is known in the art. As part of the translation feature, the software would also display the most likely common spelling of a word where more than one way of phonetic spelling could lead to non-standard spelling construction such as spelling cool as kool. Artificial Intelligence (AI) could be used to perform the decision on which way the entered phonetic input would most likely correspond to the standard English spelling of a word. An AI program could be run by the processor to enhance the accuracy of the translation as is known in the art. A removable storage device 140 may be provided to enhance customization or other functionality as is known in the art. Removable storage device 140 may be, but not limited to SD card, USB storage, etc. as is known in the art. In FIG. 3, an onboard wireless communication module is part of computer board 135 such as, but not limited to WiFi, Bluetooth, etc. to allow keyboard 110 to wirelessly interface with a user's computer or processing device such as a smartphone, etc. (not shown). A power source 145 is provided to supply the necessary energy required to power keyboard 110.

In use, the processing contained within computer board 135 interprets the user's phonetic input into standard English by referring to internal structure and rules to transparently convert the phonetic input into standard English or bi-directionally convert standard English inputs into a phonetic output. In the case where the user may wish to convert standard English into phonetic English, the processor deconstructs the standard English into the phonetic translation and displays the phonetic result.

FIG. 3 shows keyboard 110 with a wired connection 155 to connect keyboard 110 to the user's device as discussed above. In this embodiment, power source 145 may be eliminated and power for keyboard 110 may be provided through wired connection 155 as is known in the art.

Figure 4:
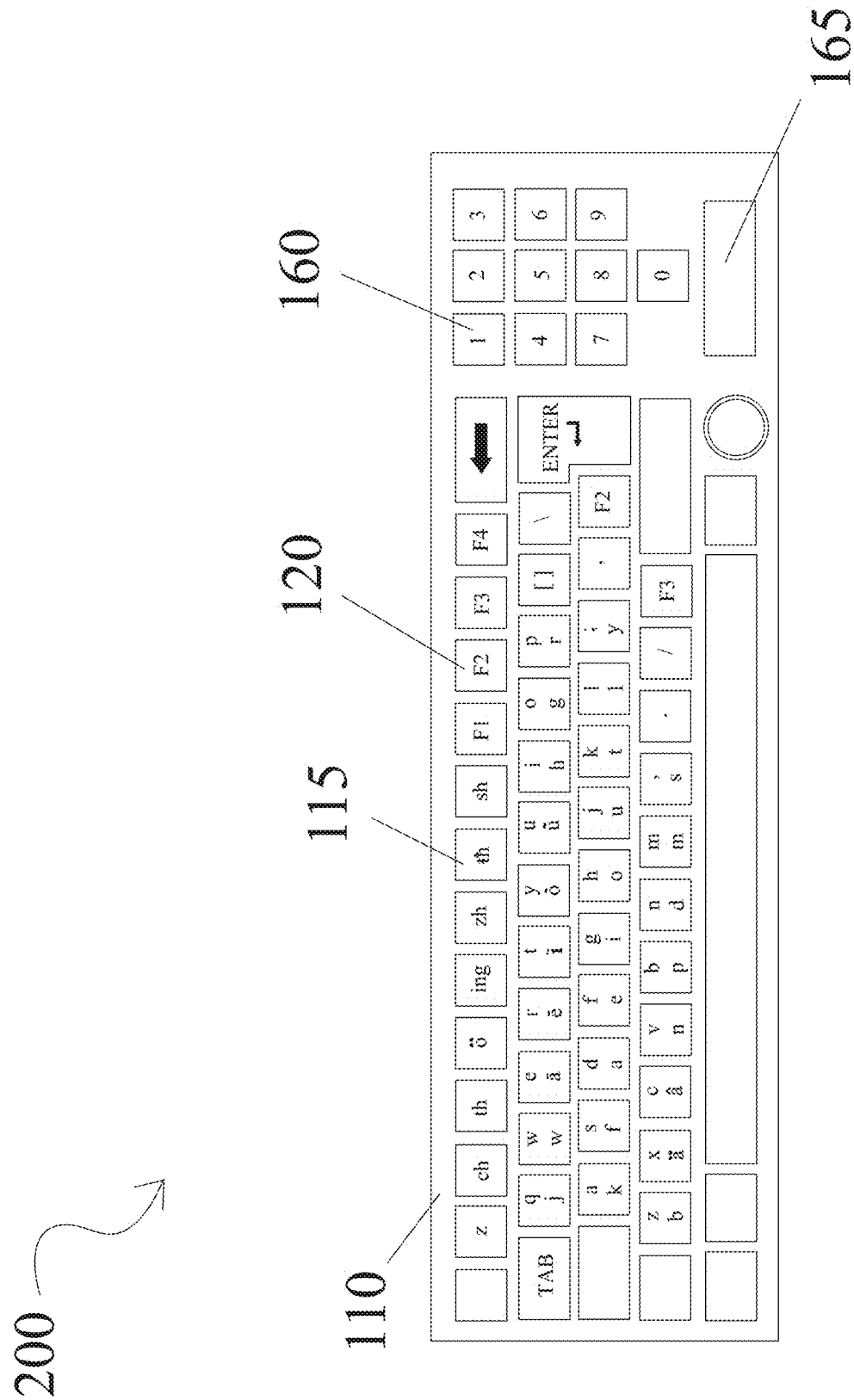
FIG. 4 is a drawing of a keyboard.

Referring now to FIG. 4, phonetic keyboard and system to facilitate communication in English 200 is shown having a separate portion of keyboard 110 having numeric keys 160 and a translation key 165. Numeric keys 160 allow the standard portion to use all phonetic symbols and still allow numbers to be used. Translation key 165 is used to translate a phonetic word into standard English and by pressing again, back into phonetic English.

Figure 5:
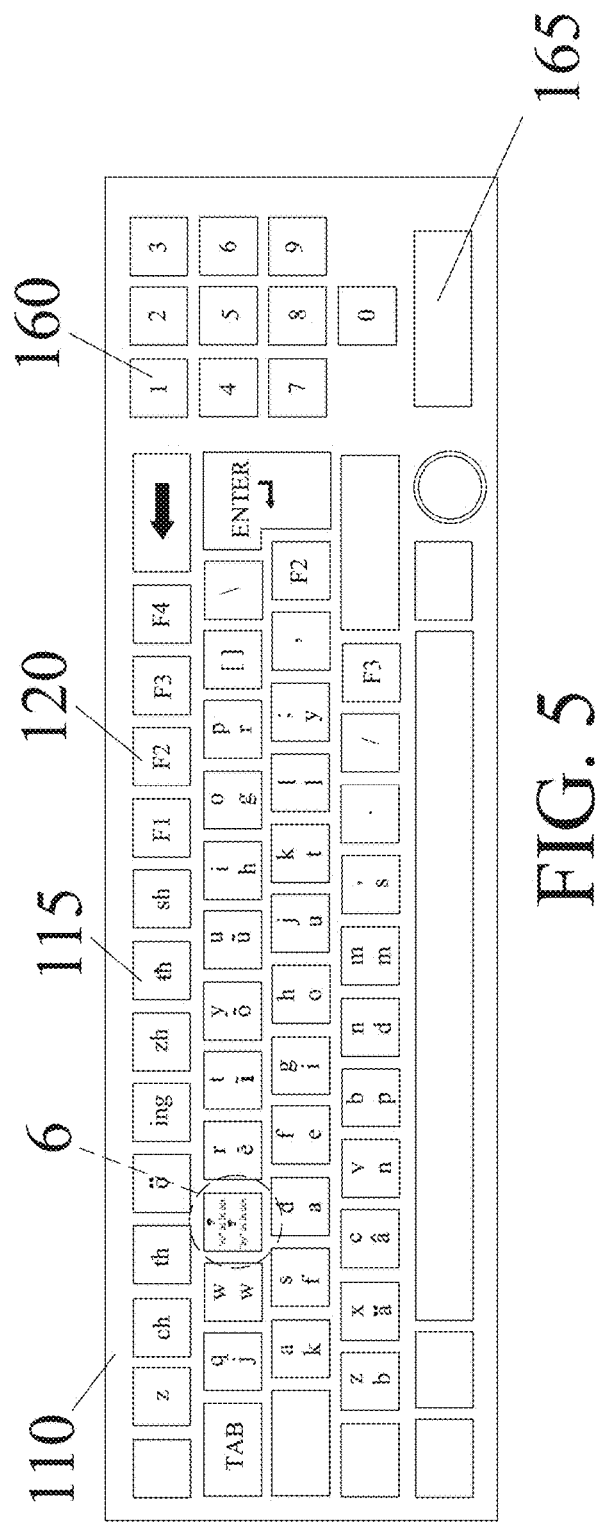
FIG. 5 is a drawing showing a pronunciation key.
Figure 6:
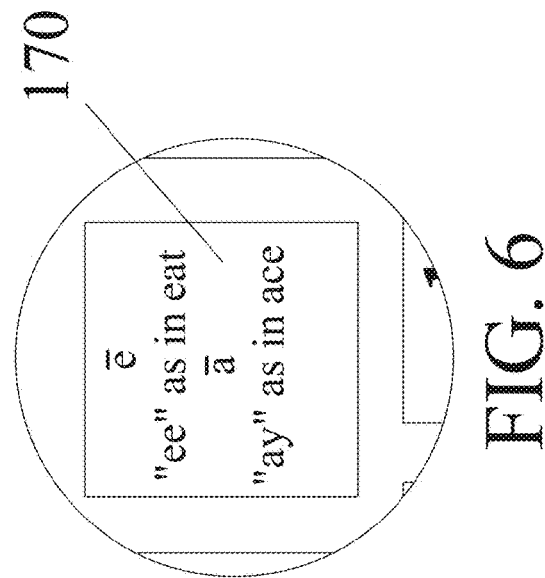
FIG. 6 is a close-up view of a portion shown in FIG. 6.

Referring to FIGS. 5 and 6, an alternative embodiment is shown with keys having pronunciation indicators 170 displayed on the key itself. Although only one key is shown having pronunciation indicator 170, it is understood that all or some of the keys could contain pronunciation indicators.

Figure 7:
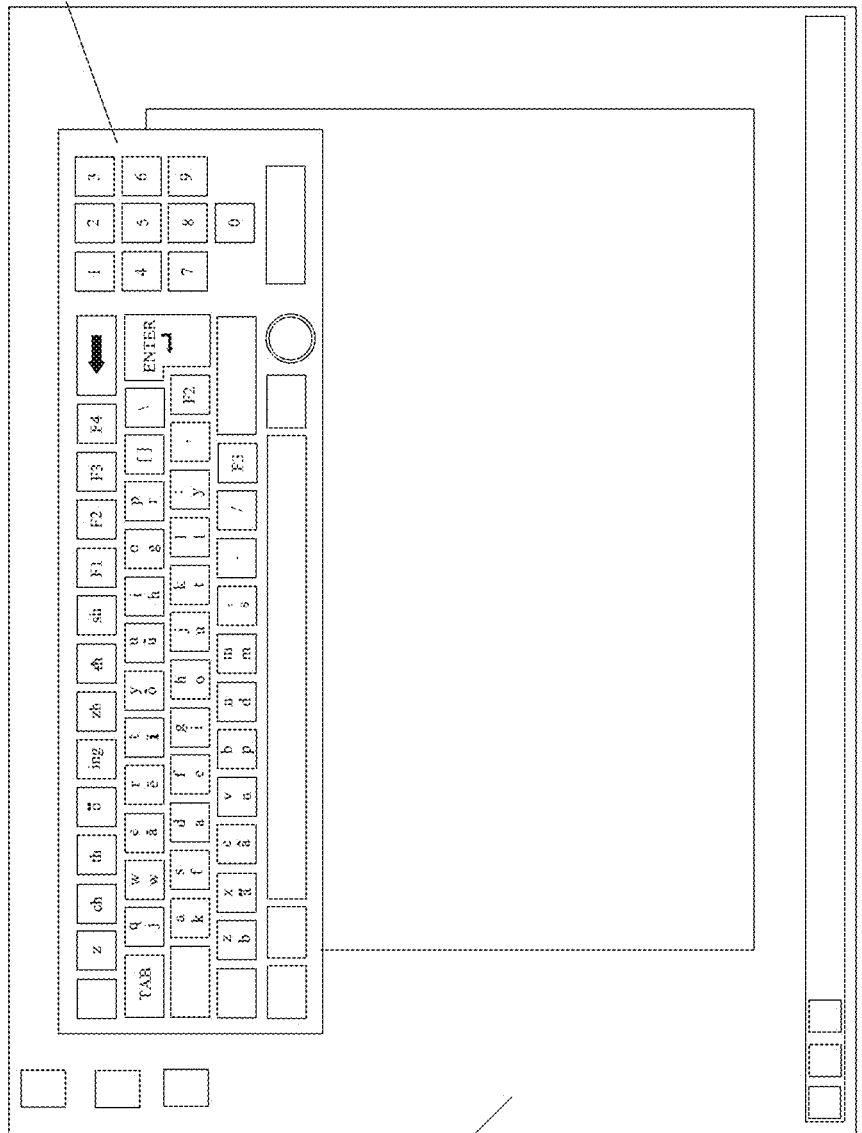
FIG. 7 is a drawing of a processing device screen showing an onscreen keyboard.

FIG. 7 shows an onscreen keyboard 170 displayed on a user's processing screen 180 that electronically reproduces the functionality discussed above. In an electronic embodiment, an app or other digital copy of the software necessary to run a phonic keyboard and system of facilitate communication in English. In this embodiment, the computer code could be provided to the user as a downloadable software package or as a portable storage system such as, but not limited to a flash drive, USB drive, SD drive, etc. If the functionality is provided by an App, the user would download the app from an appropriate App source such as APP STORE or PLAY STORE, etc.

Figure 8:
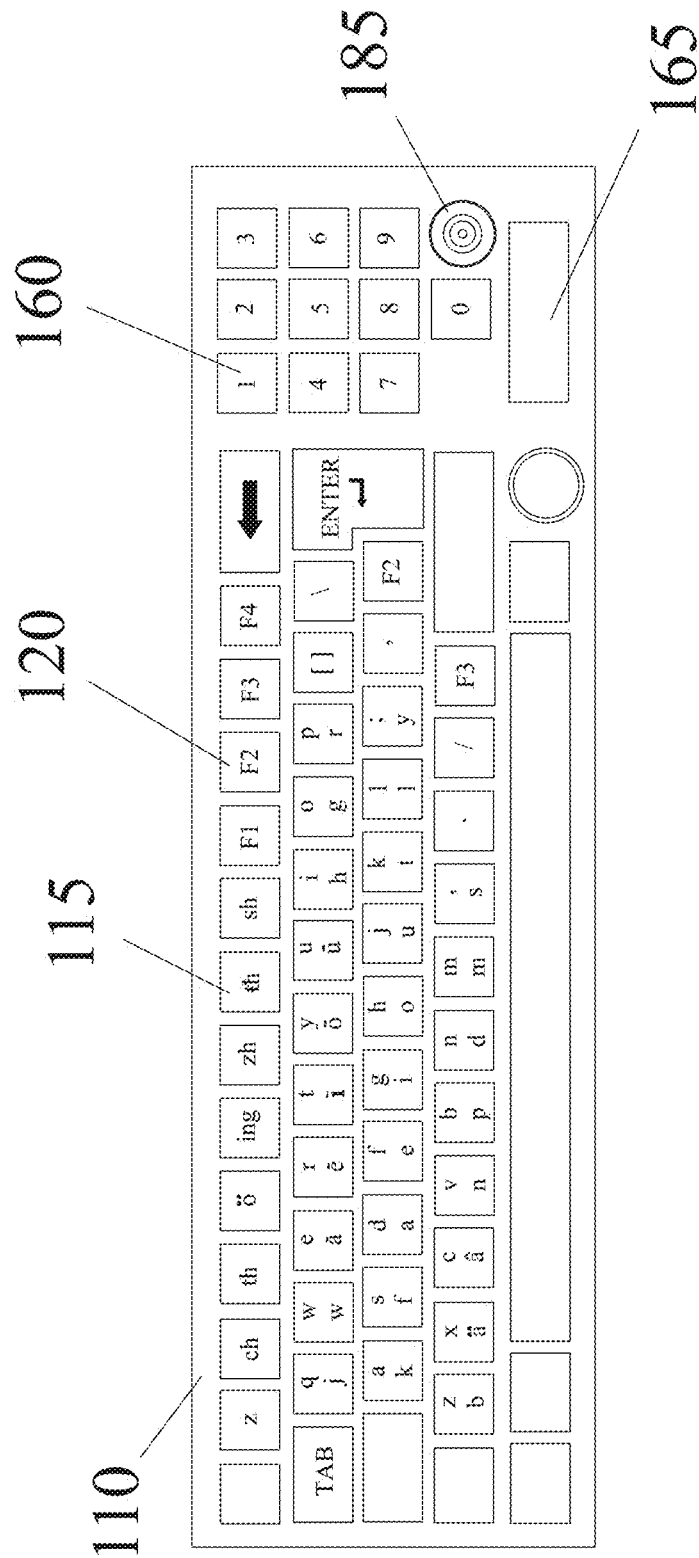
FIG. 8 is a drawing of the keyboard shown in FIG. 5 with a speaker.

Now referring to FIG. 8, a sound enabled embodiment is shown having a speaker 185 used by a speech synthesis program that resides within computer board 135 as is known in the art. This embodiment is used to provide audio clues to pronunciation.

Figure 9:
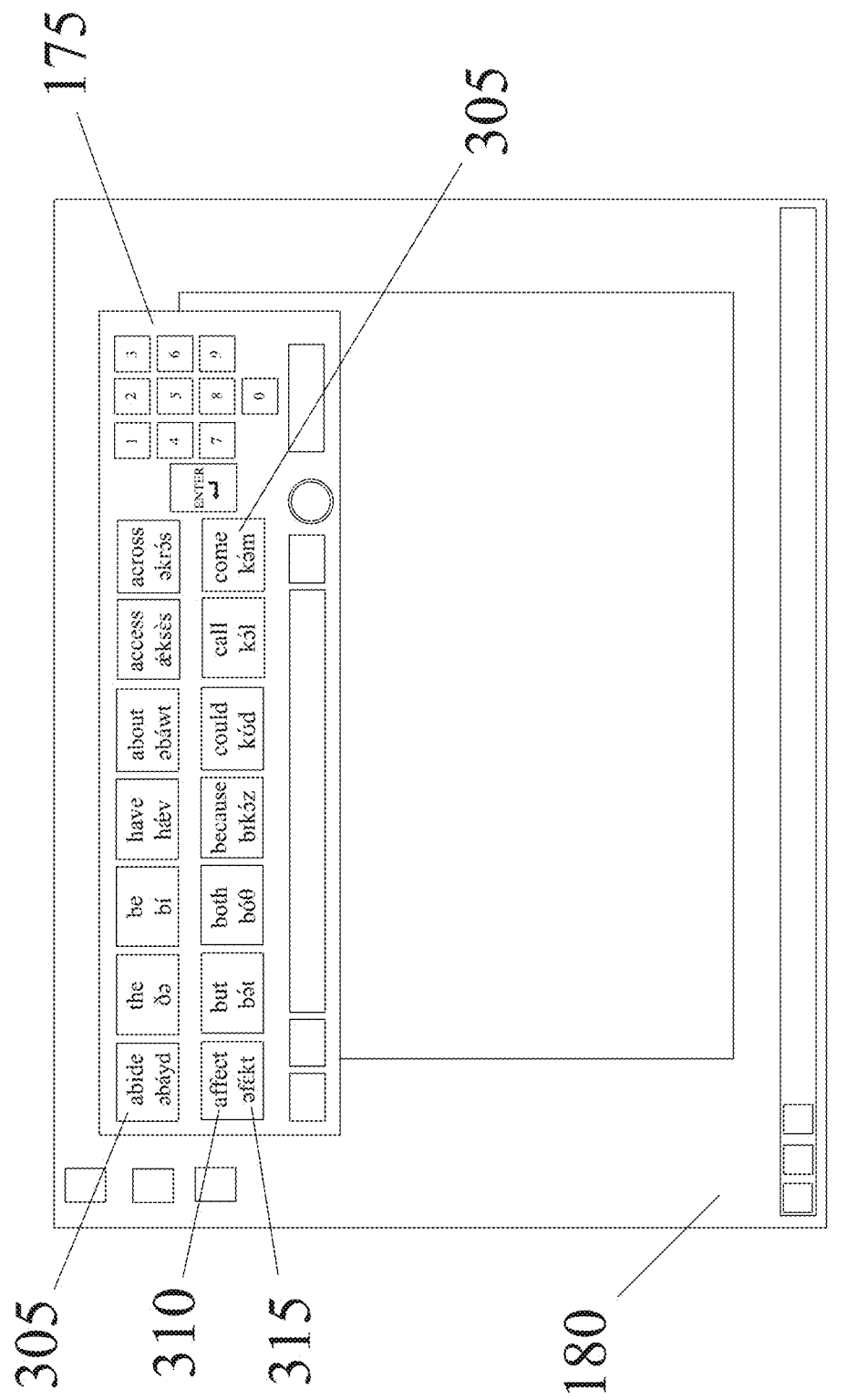
FIG. 9 is a drawing of an onscreen keyboard with soft keys that show words instead of letters.

Referring to FIG. 9, onscreen keyboard 175 is shown with soft keys 305 which are programed to show both the standard English spelling of a word 310 and a phonetic spelling 315. The user would select the words form a list of the most common English words or a search function that displays English words that can be shown on soft keys 305. There are many lists available listing the most used words in the English language as is known in the art.

Figure 10:
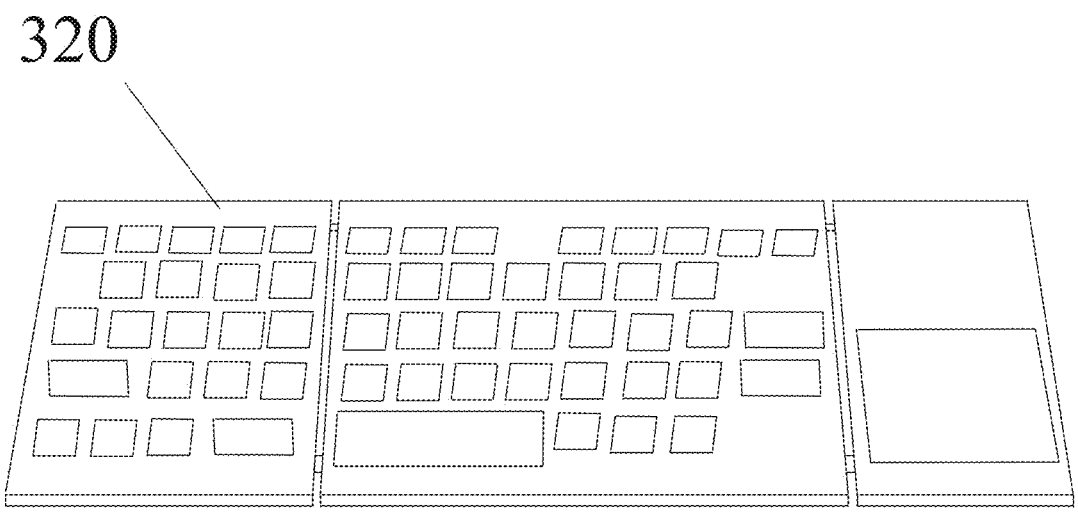
FIG. 10 is a drawing of a foldable keyboard.
Figure 11:
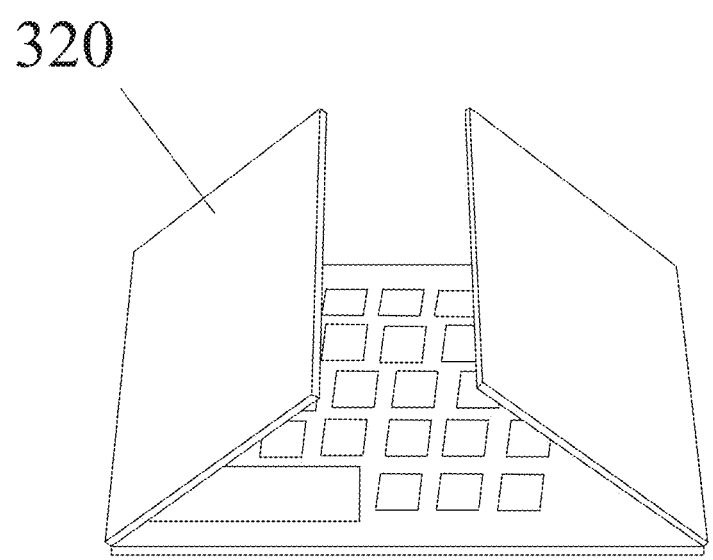
FIG. 11 is a drawing of the foldable keyboard shown in FIG. 10 in a semi-folded configuration.

Now referring to FIGS. 10 and 11, a foldable keyboard 320 is shown which would is wirelessly connected to a smart phone (not shown) or computer (not shown) through a connection such as Bluetooth, WiFi or other suitable wireless network as is known in the art. Of course a wired foldable keyboard could also be provided. Of course, although foldable keyboard 320 is shown as a trifold, other folding geometries could be used such as, but not limited to folding in half or folding in four or five sections as is known in the art to provide enhanced portability which is especially of use with smart devices such as phone or tablets.

The instant invention would be of value to the following types of users:

1. Native English-speaking adults who want to save time typing and having to spell check words since they could simply input the phonetic input on the keyboard and the system would produce a standard English output. Also, since the phonetic spelling of a word uses fewer characters than the standard spelling, such as the difference between "thorough" and "thuro" with the last o being the o with a line above it, as in the word "over".

2. Native English-speaking children who would learn the spelling of their language in elementary school parallel with their probably already-learned ability to use keyboards. For them, the language can be spelled the same as their pronunciation of it, with the instant keyboard doing the hard work of writing in standard English, correctly spelled.

3. Adult foreign learners of English, who would have the advantage of initially learning English phonetically, rather than having to immediately learn all the complicated English spelling rules with all the exceptions.

A phonetic keyboard and system to facilitate communication in English uses a specialized keyboard that interfaces with a processing device such as a computer of smart phone to allow a user to type in phonetic English with the computer processor translating the phonetic English into standard English or visa-versa. The phonetic keyboard may be wirelessly connected to the processing device or may be wired. A computer board is contained within the keyboard to provide the translating functionality by running computer code necessary to translate between phonetic English and standard English.

Although the instant invention has been described in relation to particular embodiments thereof, many other variations and modifications and other uses will become apparent to those skilled in the art.

What is claimed is:

1. A system to facilitate communication in English comprises:
    a computing device configured to execute a set of computer instructions;
    said computing device having an output device;
    a digitally produced keyboard for display on said output device wherein said digitally produced keyboard is configured to transmit an input to said computing device when a key is selected; and
    said set of computer instructions includes a routine to bi-directionally translate between a phonetic input and a standard English letter and to display a result on said output device.

2. The system of claim 1 wherein said set of computer instructions includes a word translation routine wherein said word translation routine translates a plurality of said inputs into a standard English word.

3. The system of claim 2 wherein said word translation routine includes an AI routine.

4. The system of claim 1 wherein said set of computer instructions is an APP configured to run on a personal computing device.

5. The system of claim 4 wherein said personal computing device is a smartphone.

6. The system of claim 5 wherein said APP is a downloadable app transmitted over a computer network.

7. The system of claim 1 wherein said set of computer instructions are embedded as Read Only Memory (ROM) in said computing device.

8. The system of claim 1 wherein said set of computer instructions are stored in a portable storage system.

\* \* \* \* \*